(12) United States Patent
Renvall et al.

(10) Patent No.: US 6,262,008 B1
(45) Date of Patent: Jul. 17, 2001

(54) STABILIZED SODIUM CARBONATE PEROXYHYDRATE

(75) Inventors: Ilkka Renvall, Espoo; Timo Korvela, Oulu, both of (FI)

(73) Assignee: Kemira Chemicals Oy, Helsinki (FI)

( * ) Notice: Subject to any disclaimer, the term of this patent is extended or adjusted under 35 U.S.C. 154(b) by 0 days.

(21) Appl. No.: 09/355,003

(22) PCT Filed: Jan. 23, 1998

(86) PCT No.: PCT/FI98/00062

§ 371 Date: Sep. 13, 1999

§ 102(e) Date: Sep. 13, 1999

(87) PCT Pub. No.: WO98/32831

PCT Pub. Date: Jul. 30, 1998

(30) Foreign Application Priority Data

Jan. 24, 1997 (FI) ........................................ 970314

(51) Int. Cl.⁷ ............................. C11D 3/00; C11D 3/395; C11D 7/18; C11D 7/54
(52) U.S. Cl. ............................. 510/377; 510/375
(58) Field of Search .................... 510/367, 444, 510/377, 375; 252/186.27, 186.28

(56) References Cited

U.S. PATENT DOCUMENTS

| 3,992,317 | 11/1976 | Brichard et al. . |
|---|---|---|
| 4,526,698 | 7/1985 | Kuroda et al. . |

FOREIGN PATENT DOCUMENTS

| 2420561 | 10/1975 | (DE) . |
|---|---|---|
| 487 256 B1 | 11/1991 | (EP) . |
| 0 459 625 B1 | 9/1994 | (EP) . |
| 592 969 | 3/1996 | (EP) . |
| 624 549 | 9/1997 | (EP) . |
| 675 851 | 1/1998 | (EP) . |
| 935342 | 5/1995 | (FI) . |
| 970314 | 1/1998 | (FI) . |
| 2144875A | 3/1985 | (GB) . |
| 60-30723 | 2/1985 | (JP) . |
| 61-190595 | 2/1985 | (JP) . |
| 61-36216 | 2/1986 | (JP) . |
| 1085298 | 3/1989 | (JP) . |
| 07216389 A2 | 8/1995 | (JP) . |
| WO 91/15423 | 10/1991 | (WO) . |
| WO 94/03283 | 2/1994 | (WO) . |
| WO/94/05594 | 3/1994 | (WO) . |
| WO 94/14702 | 7/1994 | (WO) . |

OTHER PUBLICATIONS

Araki, Hiroyuki, Bleaching Agent Composition, vol. 13, No. 290 (C–614).

*Primary Examiner*—Necholus Ogden
*Assistant Examiner*—John M Petruncio
(74) *Attorney, Agent, or Firm*—Greenberg Traurig LLP; Joseph M. Manak

(57) ABSTRACT

The invention relates to a stable sodium carbonate peroxyhydrate which is suited for use together with crystalline synthetic silicate-based detergents and is coated with an alkali metal sulfate and a copolymer or terpolymer of vinyl pyrrolidone.

21 Claims, No Drawings

STABILIZED SODIUM CARBONATE PEROXYHYDRATE

The invention relates to a stabilized sodium carbonate peroxyhydrate suited for use together with crystalline synthetic silicate-based detergent powders.

Sodium perborate has long been used as a bleaching agent in laundry detergents.

The principal commercial product was sodium perborate tetrahydrate (PB4). The drawback of PB4 is its poor solubility in water. When lower temperatures and the use of hydrogen peroxide activators such as TAED were adopted in the washing of laundry, a shift was made in laundry detergents to the use of sodium perborate monohydrate (PB1), which has a higher solubility. Subsequently the use of sodium perborate has also been adopted in dishwashing machine detergents instead of chlorine compounds and in stain remover salts.

Sodium perborate is a fairly economical product and relatively stable in phosphate-free detergents, which have become common especially in countries which do not have wide-scale and efficient treatment of waste waters. Perhaps the biggest drawback of sodium perborate is that it contains boron. It has been presumed that boron causes health risks and therefore, for example, maximum limits have been set for the amount of boron in drinking water, and in many places these limitations are being made stricter. For this reason there is need for a boron-free bleaching agent which is not hazardous to watercourses or to human beings. Also, the solubility of sodium perborate is not optimal for all products.

Sodium carbonate peroxyhydrate ($2Na_2CO_3 \cdot 3H_2O_2$) would theoretically be a relatively desirable product, since environmentally non-desirable degradation products are not produced from this bleaching agent. In addition, its solubility is quite good. Sodium carbonate peroxyhydrate is commonly referred to with the erroneous name of "sodium percarbonate," suggesting that the compound in question is a so-called per-compound or per-salt. As the formula presented above shows, sodium carbonate peroxyhydrate is merely a so-called addition product, in which the hydrogen peroxide is quite loosely bonded, and it contains no group corresponding to the structure of actual per-compounds, as do, for example, sodium perborate. sodium monopersulfate, alkali persulfates, etc. A real sodium percarbonate does exist, but it is a hazardous product which cannot be used in household products. Evidently owing partly to its addition structure, sodium carbonate peroxyhydrate is not very stable, and therefore high technical requirements are set for a process for the production of sodium carbonate peroxyhydrate.

In technochemical household products, for example, in dishwashing machine detergents and in stain removers the properties of which are increasingly beginning to approach those of actual detergents so that they contain, among other ingredients, tensides, enzymes, hydrogen peroxide activators, etc., it is desirable to protect sodium carbonate peroxyhydrate from decomposition.

Bleaching agents are used in technochemical household products mostly in laundry detergents. In laundry detergents, silicate-based products such as zeolites, in particular zeolite 4A, are being used increasingly instead of phosphates as so-called builders. It has not been possible to use sodium carbonate peroxyhydrate in zeolite-containing detergents because the product decomposes very rapidly upon coming into contact with zeolite. The reason for this is not precisely known. It must be taken into account that zeolites normally contain quite considerable amounts of water, for example zeolite 4A usually contains water approx. 20%.

In order to give a washing powder an environment-friendly image, zeolite is being used increasingly as a builder instead of phosphate. At the same time, the aim has been to shift to the use of sodium carbonate peroxyhydrate instead of sodium perborate. In this case, problems have been encountered owing to the instability of sodium carbonate peroxyhydrate. A large number of stabilization methods have been developed to solve this problem.

A considerable number of inventions relate to coatings which contain in the coating layers boric acids or boron salts, such as ortho- and metaborates. The use of additives such as silicates and magnesium sulfate have also been proposed. EP applications 459 625 (Mitsubishi Gas Chem.) and 675 851 (Solvey Interox) propose the use of boric acid and silicates as the coating; EP application 675 852 (Solvey Interox) boric acid and phosphates; EP application 487 256 (Kao Corp.) a borate; EP applications 652 809 and 523 169 (FMC Corp.) borosilicate and phosphonic acid derivatives; and U.S. Pat. No. 4,526,698 (Kao Corp.) a borate and an alkali metal silicate or a Mg compound.

All of such methods have the disadvantage that, even though the stability is relatively good, boron has not been entirely eliminated. Furthermore, the solubility of sodium carbonate peroxyhydrate is often decreased, which is not necessarily good. Combinations of sodium sulfate and sodium chloride have also been used for coating sodium carbonate peroxyhydrate, for example, in EP applications 592 969 and 624 549 (Solvey Interox). In these methods, stability may be based on the fact that sodium sulfate, sodium chloride and sodium carbonate which may form upon the degradation of sodium carbonate peroxyhydrate are known to form an addition product together with hydrogen peroxide. There is the disadvantage that chloride, as is known, causes corrosion of stainless steel appliances, such as household appliances. The amounts of coating must also be rather large. Furthermore, chlorinated products may be formed in a reaction between the organic ingredients of detergents, hydrogen peroxide or its degradation products and chloride.

The use of inorganic salts in a coating, together with special coating techniques, also seems to be the most common method of attempting to improve the stability of sodium carbonate peroxyhydrate.

Another group consists of coating methods based on the use of organic substances, either monomeric or polymeric.

The applicant's patent application WO-94/05594 describes a method by which a product quite stable as such is obtained. The product is highly suitable for, for example, stain removers in which sodium carbonate peroxyhydrate is used as such or for products in which relatively inert substances such as pure sodium carbonate and possibly only small amounts of ordinary detergent components are added to the said chemical.

JP application 61 36216 (Sunstar INC. et al.) describes a cleansing agent for dentures, which contains glauber salt 17% and a per-compound, e.g. sodium percarbonate. Glauber salt is a hydrous form of sodium sulfate, sodium sulfate decahydrate. Sodium percarbonate is first mixed with glauber salt, thereafter a polymer in an alcohol solution is atomized over the mixture, which polymer may be, for example, polyvinyl pyrrolidone, and the alcohol is evaporated. The product thus obtained is then mixed with the other components of the cleansing agent to obtain the final cleansing agent for dentures.

JP application 60 30723 (Matsamura Kagaku Kogyo) discloses a product for cleaning urine-stained textiles.

Sodium carbonate peroxyhydrate and certain actual peroxy compounds, such as potassium percarbonate and certain persulfates and perborate, are coated by sprinkling water-soluble non-heavy metal salt powders, such as sulfates, chlorides and phosphates, over the said hydrogen peroxide compounds or per-compounds and by using a water-soluble adhesive such as polyvinyl pyrrolidone and other water-soluble polymers which contain, among others, maleate and acrylate groups, in order to obtain the final product. It is difficult by means of powder sprinkling to render the surface of sodium carbonate peroxyhydrate sufficiently protective in order that the product could be used in detergents and in particular detergents which contain zeolite, which very rapidly decomposes sodium carbonate peroxyhydrate. At least the amounts of material used for the powder sprinkling must be quite large. Indeed, in the invention an inorganic salt is used in an amount of 20–35% in proportion to the inorganic peroxy salt.

The present applicant has developed a method (FI-patent application 935342) in which a very good stability is achieved with a sodium sulfate coating in, for example, a carbon dioxide atmosphere, when the product is tested in a mixture with zeolite. The method has the drawback that usually a rather large amount of sodium sulfate is needed in order to achieve high stability in long-term tests and severe conditions. The achieving of a high stability requires a sodium sulfate content of approx. 25%. In this case the active oxygen content of the product drops from 13–14%, which is the practical value for sodium carbonate peroxyhydrate, to below 11%. In certain detergent applications this is too low a value in order for the detergent to be optimally formulated without its containing too much of a component containing a bleaching agent. For this reason it would be desirable to decrease the amount of coating.

It is an object of the present invention to provide a storage-stable sodium carbonate peroxyhydrate which, when coming into contact with silicate-based detergents, remains undegraded for quite a long time. It is also an object of the invention to make possible the production of detergent compositions the ingredients of which are environment-friendly.

These objects are achieved in accordance with the invention with a stable sodium carbonate peroxyhydrate which is coated with an alkali metal sulfate and a copolymer or terpolymer of vinylpyrrolidone.

The characteristics of the invention are stated in the accompanying claims 1–16.

It was observed, surprisingly, that by using certain copolymers or terpolymers of vinyl pyrrolidone together with an alkali metal sulfate for coating sodium carbonate peroxyhydrate, a very stable product was obtained which is suitable for use with silicate-based detergents, such as zeolites and sheet silicates. Furthermore, it was observed that in order to achieve the same stability as has a product coated with sodium sulfate alone, the use of copolymers or terpolymers makes it possible to decrease the amount of sodium sulfate. Thereby the active oxygen content of sodium carbonate peroxyhydrate is retained and optimal formulation in detergent applications is facilitated, since bleaching agent need not be used in excessive amounts.

The coating can be carried out by known procedures, preferably by the fluidization technique, wherein sodium sulfate and the polymer-containing solution according to the invention are atomized into a fluid-bed drier in a selected order. The atomization may also be carried out so that the polymer and the sodium sulfate are mixed together to form a solution. Often in such a case the dissolving must take place immediately before the atomization in order that no precipitation should occur. The coating can also be carried out by kneading the sodium carbonate peroxyhydrate in the said mixture. This is very economical if the sodium carbonate used as the initial substance is finely divided, in which case an increase of the particle size is also achieved by granulation.

Since sodium carbonate peroxyhydrate is an alkaline product which is catalyzed by all heavy-metal ions, their hydroxides, oxides and oxyhydroxides, it is clear that stabilization can be improved by using known chelators of metals, such as phosphonic acid derivatives, aminopolycarboxylic acids, antioxidants, etc., which are used for stabilizing hydrogen peroxide in alkaline conditions.

Polymers according to the invention can be used advantageously in both the intermediate layer and the surface layer, i.e. the sodium sulfate may be added after the polymer treatment or before it In this case the use of blends of polymers and sodium sulfate is also possible.

The polymers usable for coating in accordance with the invention include the copolymers and terpolymers of vinyl pyrrolidone. The copolymer or terpolymer is formed by polymerizing together N-vinyl pyrrolidone and a monomer which contains at least one vinyl group.

The monomer which contains a vinyl group may be an a-olefin which contains 2–20 carbon atoms, an aromatic monomer, an ester monomer, an ester monomer derivative, a (meth)acrylic acid derivative or a heterocyclic monomer. The α-olefin may be, for example, ethylene, propylene, 1-butene, 1-pentene, 1-hexene, 1-heptene, 1-octene, 1-decene, 1-hexadecene or 1-eicocene. The aromatic monomer may be a styrene or a methyl styrene. The ester monomer may be, for example, selected from the group consisting of vinyl acetate, (meth)acrylic acid N-alkylaminoalkyl ester, or a quaternized salt of these. The (meth)acrylic acid derivative may be, for example, a (meth)acrylic acid amide derivative. The heterocyclic monomer may be, for example, vinyl caprolactame. The terpolymer may be formed, for example, by polymerizing together N-vinyl pyrrolidone, vinyl caprolactame and dimethylaminoethyl (meth)acrylate monomer. Preferred polymers include N-vinyl pyrrolidone 1-butyl copolymer or N-vinyl pyrrolidone 1-hexadecane copolymer. Copolymers which have been formed by polymerizing N-vinyl pyrrolidone with styrene, methyl styrene, vinyl acetate, di-(1-3 carbon atom) alkylamino-(2-6 carbon atom)alkyl (meth)acrylate, vinyl caprolactame or (meth)acrylic acid amide derivative, such as (3-(methacryloylamino)propyl)trimethyl ammonium chloride.

It is also possible to use homopolymers of vinyl pyrrolidone, such as polyvinyl pyrrolidone (PVP), as an additive in the coating of sodium carbonate peroxyhydrate. However, such additives do not provide any significant advantages over sodium sulfate alone when coated sodium carbonate peroxyhydrates are tested in a blend with silicate-based detergents. The products are, however, well suited for blends in which a silicate-based detergent is not used as a blend component, such as stain remover salts.

The sodium carbonate peroxyhydrate according to the invention, containing sodium sulfate and a polymer, is suitable for use with silicate-based detergent powders, such as zeolites and sheet silicates.

The use of coatings is not limited only to products containing zeolite 4A. It is known that, for example, zeolite 24A contains less water than does zeolite 4A, and sodium carbonate peroxyhydrate decomposes more slowly in contact with zeolite 24A than with zeolite 4A. In products which contain zeolite 24A (Crosfield Group) it is also possible to use coatings according to the invention to improve further the stability of sodium carbonate peroxyhydrate. The coatings according to the invention are also suitable for products which contain so-called sheet silicates, which are produced by, for example, Hoechst AG.

It has been presumed that the decomposition of sodium carbonate peroxyhydrate is due to the effect of water. This water may be derived from outside or from the decomposition of the product. The hypothesis has been that such water must be bonded if it is formed between the percarbonate and the coating, or it is necessary to prevent its access to dissolve the product, whereupon hydrogen peroxide is released and passes into the alkaline solution, in which hydrogen peroxide is known to decompose rapidly and especially if there are present heavy metal ions, their hydroxides, oxides or oxyhydroxides. As regards zeolites, a hypothesis is that zeolite 4A normally contains adsorbed water approx. 20%. This water may "dissolve" sodium carbonate peroxyhydrate, whereupon the hydrogen peroxide passes into an alkaline solution, in which hydrogen peroxide is known to be instable, especially in the presence of heavy metal ions and their hydroxides, oxides or oxyhydroxides. Another hypothesis is that hydrogen peroxide is very apt to change places with the water present in zeolite. Thereupon, hydrogen peroxide would decompose quite easily.

In the product according to the invention it is surprising that the most hygroscopic polymers usually worked best and, in turn, those products the water adsorption capacity of which is lowest, but by no means zero, yielded poorer results. Thus, for example, the water present in zeolite may not as such be the crucial factor in the decomposition process; the decomposition must to a considerable degree be due to other factors. It is known that at an elevated temperature an adduct of hydrogen peroxide can be prepared from polyvinyl pyrrolidone at an elevated temperature. One hypothesis could be that the products in question would form an adduct preventing the decomposition of hydrogen peroxide as hydrogen peroxide is released under the effect of water.

It may also be that a perhydroxyl anion which forms especially rapidly from hydrogen peroxide in alkaline conditions becomes in some manner bonded to the nitrogen group, or that a hydroxyl radical which forms from the perhydroxyl anion and may promote a chain reaction reacts with the polymer concerned and at the same time becomes inactive. This would be supported by the fact that polyvinyl pyrrolidone contains tertiary nitrogen, which may in part stabilize the alkaline decomposition process of hydrogen peroxide. Thus a good additive must be sufficiently hygroscopic, but it must not moisten the product and it must react with hydrogen peroxide or the products of further reactions thereof.

EXAMPLES

In all of the coating tests of examples 1–5, the material which was coated was a sodium carbonate peroxyhydrate (NPH) having an active oxygen content of 14.3% as measured by conventional potassium permanganate titration.

For the measuring of NPH stability there is commonly used a method in which the product is packed into a tightly closed cardboard case, and thus the method should illustrate the behavior of the product in an unopened consumer package. Such a package is then placed in a climate chamber the temperature and relative humidity of which are set at certain values, for example, 30° C. and a relative humidity of 70%. If the product is somehow stable, obtaining sufficient information about the stability of the product would require long periods. Furthermore, the method does not provide information of how the product behaves when the package has been opened and it comes into contact with air. Another method used is to place the product in a container which is closed with slightly permeable plastic film or a perforated film. This does not always provide reliable results, either, since the oxygen formed upon the decomposition of NPH is capable, at least in part, of preventing the ambient air from coming into contact with the product. The same difficulties are encountered when the product is tested in plastic bags which are not completely airtight.

The applicant has used a method which has worked well in the applicants tests and which yields reliable results regarding the behavior of the product already after a test period of one week. Two-week tests already yield very reliable results. The test conditions are, however, quite severe, since the products are tested in an open vessel at a temperature of 30° C. and a relative humidity of 70%.

It has been observed previously that, for example zeolites very rapidly decompose sodium carbonate peroxyhydrate. In the present invention, a method was used in which NPH is mixed at a ratio of 1:1 with a commercial finely-divided zeolite 4A having a particle size of approx. 10 microns. Such a blend is tested under the same conditions as were described above.

The method is overall as follows: If the question is of pure NPH, precisely approx. 4–5 g of NPH is weighed into an open, flat-bottomed glass vessel having edges and a capacity of 15 ml. This vessel is placed in a climate chamber with the conditions stated above. After a predetermined period the vessel is taken out of the climate chamber. The contents and the hydrogen peroxide concentration are determined by a known potassium permanganate method. If the effect of zeolite is being examined, NPH is mixed well with an equal amount by weight of a commercial zeolite 4A, in total 4–5 grams.

Example 1

Table 1 shows the stability of NPH alone and mixed with zeolite.

TABLE 1

Decrease of the active oxygen content of NPH alone and in a blend with zeolite, measured in percentages
Product/time/decomposition %

|  | 1 week | 2 weeks | 3 weeks | 4 weeks |
|---|---|---|---|---|
| NPH | 5.7 | 7.0 | 8.7 | 10.4 |
| NPH + zeolite | 44.0 | 65.5 | 80.0 | 87.0 |

It can be observed from the results that the stability of NPH is still quite good after two weeks, but in a mixture with zeolite its stability is very poor.

Example 2

Table 2 shows the decomposition results, at different sodium sulfate concentrations, of NPH samples coated by the method described in the applicant's FI application 935342.

TABLE 2

Decomposition of NPH samples coated with different sodium sulfate concentrations in a mixture with zeolite 4A in 2-week tests
Product/NAS content/decomposition %

|  | 25% | 20% | 15% | 10% | 5% |
|---|---|---|---|---|---|
| NPH + zeolite | 14.3 | 16.0 | 17.8 | 20.8 | 25.0 |

NPHs coated in accordance with the invention are described in the following examples:

Example 3

The coating tests were carried out by using an Aeromatic Strea 1 apparatus. The polymers were dissolved in water to form saturated solutions of at maximum 10 percent concentration. An approx. 29 percent aqueous solution of sodium sulfate was used as the sodium sulfate solution. The solutions were atomized in an elective order by means of a 2-phase atomizer by using air as the atomization gas. The coating amounts and thereby the coating thickness could be varied by changing the solution amounts fed in.

If the sodium sulfate solution also contained a polymer solution, this solution had to be atomized immediately in order to avoid precipitation, otherwise an uneven coating was formed.

When the objective was to produce a polymer-containing coating with a sodium sulfate concentration of 20 percent, the following amounts of materials were used:
300 g NPH
6 or 12 g polymer (concentration 1.6–3.1%) (recipes 1 and 2)
75 g sodium sulfate (NAS content 19.7–19.4%=approx. 20%)

When the polymer was fed in last, the polymer charge used was 15 g (3.8%), recipe 3.

By feeding in smaller amounts of solution, it was possible to reduce the amounts of sodium sulfate and polymer in the final coated product.

In the following test, the following homopolymers of vinyl pyrrolidone were used:
K-30 of International Specialty Products (ISP), molecular weight 38,000
K-90 of ISP, molecular weight 630,000
PVP of Aldrich Chemicals, catalogue number 85, 654-2, molecular weight 10,000, denoted in the table by PVP A.

TABLE 3

Comparative tests with NPH samples coated with approx. 20 percent NAS and a polymer, decomposition percentage after 2 weeks in a blend with zeolite 4A

| Polymer used | Recipe | Decomposition |
|---|---|---|
| K-30 | 1 | 15.3% |
| K-30 | 2 | 20.8% |
| K-30 | 3 | 13.3% |
| K-90 | 1 | 15.4% |
| K-90 | 2 | 18.8% |
| K-90 | 3 | 22.7% |
| PVP A 1 | | 15.0% |
| PVP A 2 | | 19.6% |
| PVP A 3 | | 15.1% |

Example 4

In the following tests, the following vinyl pyrrolidone polymers were used:

Antara® 430=vinyl pyrrolidone—styrene copolymer (ISP product)
Antarons P 904 =butylpolyvinyl pyrrolidone (ISP product)
ACP =vinyl pyrtolidone acrylic acid (VP/AC) copolymer (ISP product)
ACP 1005 VP/AC 25:75, molecular weight high
ACP 1033 VP/AC 75:25, molecular weight average
ACP 1042 VP/AC 25:75, molecular weight average The ACP products were the least hygroscopic of the polymers used in the test.

TABLE 4

Results obtained with different products and recipes, the amount of NAS being approx. 20%

| | | Decomposition | |
|---|---|---|---|
| Polymer | Recipe | alone 2 weeks | with zeolite 2 weeks |
| Antara ® 430 | 1 | 4.8% | 8.5% |
| Antaron ® P 904 | 1 | 4.0% | 10.0% |
| " | 3 | 7.3% | 9.8% |
| ACP 1005 | 1 | 8.3% | 22.8% |
| ACP 1033 | 1 | 7.0% | 39.8% |
| ACP 1042 | 1 | 7.7% | 17.5% |

Example 5

In the following series, the effect of the amounts of coating was examined, the amount of polymer being 1.6–2.0% (6 g) of the total end product amount.

TABLE 5

Effects of different amounts of coating

| Polymer | NAS | Decomposition with zeolite 2 weeks |
|---|---|---|
| PVP A | 0% | 51.0% |
| " | 5% | 34.4% |
| " | 10% | 25.0009% |
| " | 20% | 16.7% |
| Antara ® 430 | 0% | 42.2% |
| " | 5% | 41.4% |
| " | 10% | 12.5% |
| " | 20% | 7.9% |
| Antaron ® P 904 | 0% | 45.8% |
| " | 5% | 33.6% |
| " | 10% | 11.0% |
| " | 20% | 6.0% |

Example 6

In the following, the stability of poor-grade NPH was tested, the NPH being coated with a copolymer or terpolymer of vinyl pyrrolidone together with sodium sulfate. The product was contacted with zeolite (4A) at 30° C. and a relative humidity of 70%. The relative decomposition percentages shown in the table were obtained through a comparison with NPH coated with only sodium sulfate in corresponding conditions.

TABLE 6

NPH stability tests
NPH was coated with 10 per cent sodium sulfate and polymer, decomposition in a blend with zeolite (50:50) during 2 weeks at 30° C. and a relative humidity of 70%

| Polymer/coating order/ concentration/rela. stability | coating %/ relative decomposition % | coating %/ relative decomposition % | coating %/ relative decomposition % | coating %/ relative decomposition % | coating %/ relative decomposition % |
|---|---|---|---|---|---|
| 1. ANTARON P-904 | | | | | |
| PVP-NAS | | | 1%/58.5% | | 1.5%/48.8% |
| NAS-PVP | | | 1%/47.3% | | 1.5%/50.0% |
| 2. ANTARON V-216 | | | | | |
| PVP-NAS | | | 1%/53.3% | | |
| 3. ANTARA 430 | | | | | |
| PVP-NAS | | | 1%/57.6% | | |
| NAS-PVP | | | 1%/61.3% | | |
| 4. COPOLYMER 845 | | | | | |
| PVP-NAS | | | 1%/61.4% | | |
| NAS-PVP | | | 1%/69.5% | | |
| 5. COPOLYMER 937 | | | | | |
| PVP-NAS | | | 1%/61.8% | | |
| NAS-PVP | | | 1%/58.3% | | |
| 6. COPOLYMER 958 | | | | | |
| PVP-NAS | | | 1%/58.6% | | |
| NAS-PVP | | | 1%/83.8% | | |
| 7. H2OLD EP-1 | | | | | |
| PVP(10%)-NAS | | | 1%/51.0% | | |
| PVP(5%)-NAS | | | 1%/40.6% | | |
| NAS-PVP(10%) | | | 1%/48.7% | | |
| NAS-PVP(5%) | | | 1%/49.0% | | |
| 8. GAFQUAT HS-100 | | | | | |
| PVP-NAS | | 0.8%/46.0% | | 1.4%/47.8% | |
| NAS-PVP | | 0.8%/54.5% | | 1.5%/55.7% | |
| 9. GAFQUAT 734 | | | | | |
| PVP-NAS | | | 1%/49.7% | | |
| NAS-PVP | | | 1%/46.1% | | |
| 10. GAFQUAT 755 N | | | | | |
| PVP-NAS | | | 1%/53.9% | | |
| NAS-PVP | | | 1%/67.5% | | |
| 11. PVP/VA W 735 | | | | | |
| PVP-NAS | 0.5%/54.2% | | 1%/64.3% | | |
| NAS-PVP | 0.5%/48.4% | | 1%/71.7% | | |

Products of International Specialty Products used in the table:

| | |
|---|---|
| Antaron ® P-904 = | Butylated PVP |
| Antaron ® V-216 = | PVP/hexadecene copolymer |
| Antara ® 430 = | vinyl pyrrolidone/styrene copolymer |
| PVP/VA 735W = | poly(vinyl pyrrolidone/vinyl acetate copolymer) |
| Copolymer 845 = | poly(vinyl pyrrolidone/dimethylaminoethyl methacrylate) |
| Copolymer 937 = | poly(vinyl pyrrolidone/dimethylaminoethyl methacrylate) |
| Copolymer 958 = | poly(vinyl pyrrolidone/dimethylaminoethyl methacrylate) |
| H₂OLD ® EP-1 = | terpolymer of vinyl caprolactame, vinyl pyrrolidone and dimethylaminoethyl methacrylate |
| Gafquat ® HS-100 = | copolymer of vinyl pyrrolidone and methacrylamidopropyltrimethyl ammonium chloride |
| Gafquat ® 734 and 755 N = | quaternized copolymer of vinyl pyrrolidone and dimethylaminoethyl methacrylate |
| Other legend: | |
| PVP = | copolymer or terpolymer of vinyl pyrrolidone |
| PVP-NAS = | coated first with PVP and then with sodium sulfate |
| NAS-PVP = | coated first with sodium sulfate and then with PVP |
| PVP(X %) = | an X per cent polymer solution used |
| Coating % = | proportion of polymer of the NPH amount |
| Decomposition % = | decomposition as a percentage of the decomposition of NPH coated with only sodium sulfate |

It can be seen that with the use of copolymers or terpolymers of vinyl pyrrolidone in an amount of 0.5–1.5%

(acronym PVP is used for the polymers in the table even though the actual vinyl pyrrolidone homopolymer, PVP, was not used) the decomposition of NPH is reduced to 40–60% of what is achieved with only sodium sulfate coating.

What is claimed is:

1. In a crystalline or synthetic silicate-based detergent composition, the improvement wherein the composition comprises granules of sodium carbonate peroxyhydrate coated with an alkali metal sulfate and a co-polymer or terpolymer of vinyl pyrrolidone.

2. The detergent composition of claim 1 wherein the silicate component is a zeolite.

3. The detergent composition of claim 1 wherein the silicate component is a sheet silicate.

4. The detergent composition of claim 1 wherein the alkali metal sulfate is sodium sulfate or potassium sulfate.

5. The detergent composition of claim 1 wherein the copolymer or terpolymer is formed by polymerizing together N-vinyl pyrrolidone and a monomer which contains at least one vinyl group.

6. The detergent composition of claim 1 wherein the copolymer is formed by polymerizing together N-vinyl pyrrolidone and an α-olefin monomer which contains 2–20 carbon atoms.

7. The detergent composition of claim 6 wherein the α-olefin which contains 2–20 carbon atoms is selected from the group consisting of ethylene, propylene, 1-butene, 1-pentene, 1-hexene, 1-heptene, 1-octene, 1-decene, 1-hexadecene and 1-eicocene.

8. The detergent composition of claim 1 wherein the copolymer is a N-vinyl pyrrolidone 1-butyl copolymer or a N-vinyl pyrrolidone 1-hexadecane copolymer.

9. The detergent composition of claim 1 wherein the copolymer is formed by polymerizing together N-vinyl pyrrolidone and an aromatic monomer containing a vinyl group.

10. The detergent composition of claim 1 wherein the copolymer is formed by polymerizing together N-vinyl pyrrolidone and an ester monomer containing a vinyl group.

11. The detergent composition of claim 1 wherein the copolymer is formed by polymerizing together N-vinyl pyrrolidone and an ester monomer derivative containing a vinyl group.

12. The detergent composition of claim 1 wherein the copolymer is formed by polymerizing together N-vinyl pyrrolidone and a (meth)acrylic acid amide derivative.

13. The detergent composition of claim 1 wherein the copolymer is formed by polymerizing together N-vinyl pyirolidone and a heterocyclic monomer containing a vinyl group.

14. The detergent composition of claim 1 wherein the terpolymer is formed by polymerizing together N-vinyl pyrrolidone, vinyl caprolactam and dimethylaminoethyl (meth)acrylate monomer.

15. The detergent composition of claim 9 wherein the aromatic monomer is styrene or methyl styrene.

16. The detergent composition of claim 10 wherein the ester monomer is vinyl acetate.

17. The detergent composition of claim 11 wherein the ester monomer derivative is selected from the group consisting of N-alkylaminoalkyl esters of acrylic or methacrylic acid and quaternized salts thereof.

18. The detergent composition of claim 17 wherein the N-alkylaininoalkyl ester of (meth)acrylic acid is di-(1-3 carbon atom)alkylamino-(2-6 carbon atom)alkyl (meth)acrylate.

19. The detergent composition of claim 17 wherein the N-alkylaminoalkyl ester of (meth)acrylic acid is dimethylaminoethyl (meth) acrylate or diethylaminoethyl (meth) acrylate.

20. The detergent composition of claim 12 wherein the (meth)acrylic acid amide derivative is (3-(methacryloylamino)-propyl)-tri-methyl ammonium chloride.

21. The detergent composition of claim 13 wherein the heterocyclic monomer is vinyl caprolactame.

* * * * *